(12) United States Patent
Hammoud

(10) Patent No.: US 7,940,962 B2
(45) Date of Patent: May 10, 2011

(54) SYSTEM AND METHOD OF AWARENESS DETECTION

(75) Inventor: Riad I. Hammoud, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 949 days.

(21) Appl. No.: 11/890,066

(22) Filed: Aug. 3, 2007

(65) Prior Publication Data

US 2009/0034801 A1 Feb. 5, 2009

(51) Int. Cl.
*G06K 9/00* (2006.01)
(52) U.S. Cl. .......................... 382/104; 382/117; 382/118
(58) Field of Classification Search .................... 382/104
See application file for complete search history.

(56) References Cited

U.S. PATENT DOCUMENTS

| | | | | |
|---|---|---|---|---|
| 5,008,946 A * | 4/1991 | Ando | ............................ | 382/104 |
| 6,154,559 A * | 11/2000 | Beardsley | ..................... | 382/103 |
| 7,486,825 B2 * | 2/2009 | Yuasa | ........................... | 382/190 |
| 7,848,548 B1 * | 12/2010 | Moon et al. | ................... | 382/118 |
| 2001/0019620 A1 * | 9/2001 | Nagai et al. | .................. | 382/104 |
| 2003/0021448 A1 * | 1/2003 | Chen et al. | ..................... | 382/117 |
| 2003/0123754 A1 * | 7/2003 | Toyama | ........................ | 382/291 |
| 2003/0169907 A1 * | 9/2003 | Edwards et al. | ............... | 382/118 |
| 2004/0240708 A1 * | 12/2004 | Hu et al. | ......................... | 382/103 |
| 2005/0100191 A1 * | 5/2005 | Harbach et al. | ............... | 382/103 |
| 2005/0100195 A1 * | 5/2005 | Li | ................................... | 382/118 |
| 2005/0226471 A1 * | 10/2005 | Singh et al. | .................... | 382/118 |
| 2005/0232461 A1 | 10/2005 | Hammoud | | |
| 2006/0204042 A1 | 9/2006 | Hammoud et al. | | |
| 2006/0251297 A1 | 11/2006 | Hammoud et al. | | |
| 2008/0089559 A1 * | 4/2008 | Koumura | ....................... | 382/117 |
| 2009/0034801 A1 * | 2/2009 | Hammoud | ..................... | 382/107 |
| 2009/0190803 A1 * | 7/2009 | Neghina et al. | ............... | 382/118 |

\* cited by examiner

*Primary Examiner* — Sath V Perungavoor
(74) *Attorney, Agent, or Firm* — Jimmy L. Funke

(57) ABSTRACT

An awareness detection system and method are provided. The system includes an imaging device positioned to obtain a plurality of images of at least a portion of a subject's head, and an awareness processor in communication with the imaging device. The awareness processor receives an image from the imaging device and performs the steps including conducting a two-point head pose analysis when two eyes of the subject are located, conducting a one-point head pose analysis when only one eye of the subject is located, and conducting a zero-point head pose analysis when zero eyes of the subject are located. The awareness processor further performs the steps of detecting at least one point of interest in the image, conducting a motion analysis of the image to estimate a head pose of the subject, and determining a state of awareness of the subject.

21 Claims, 8 Drawing Sheets

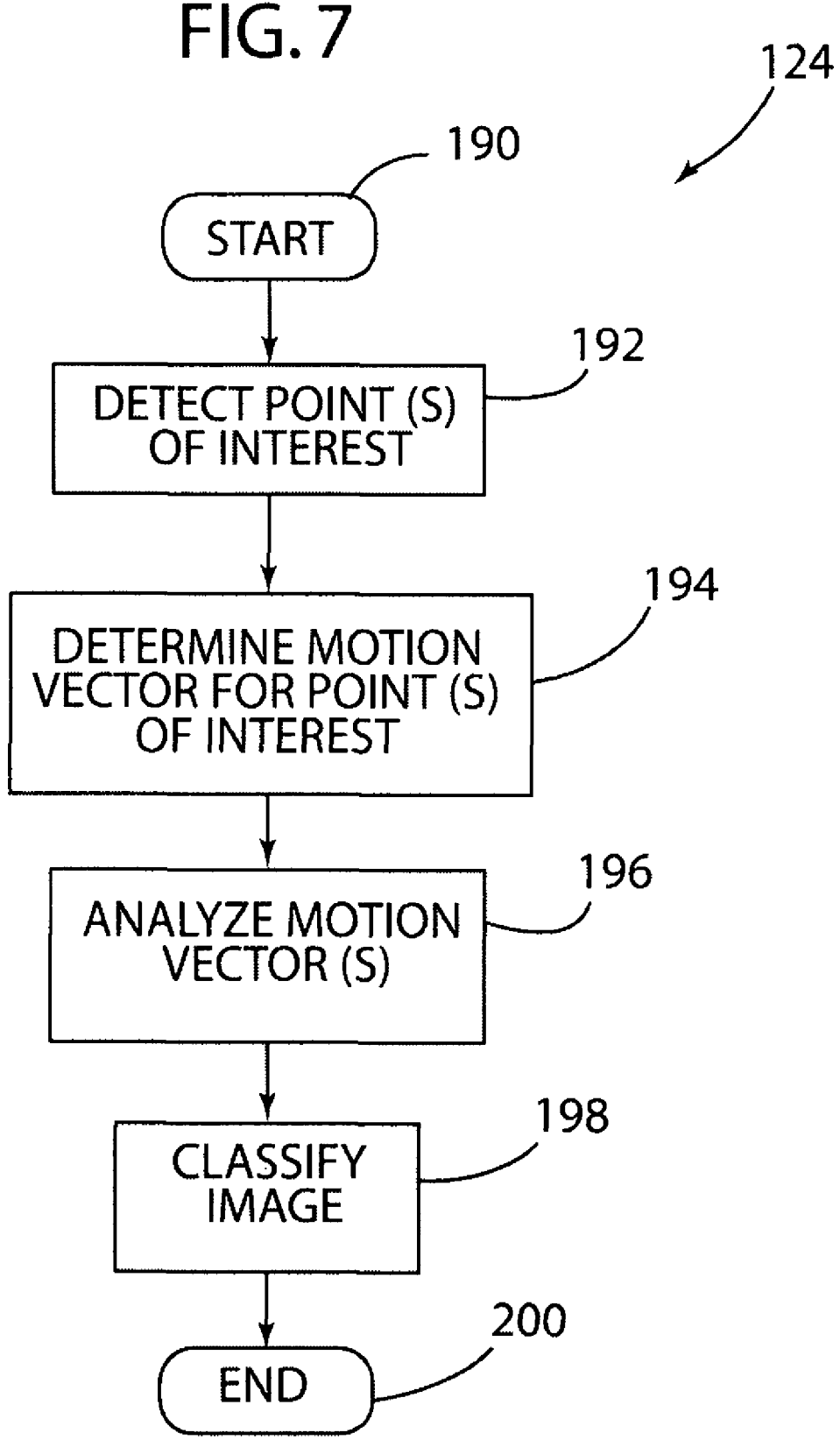

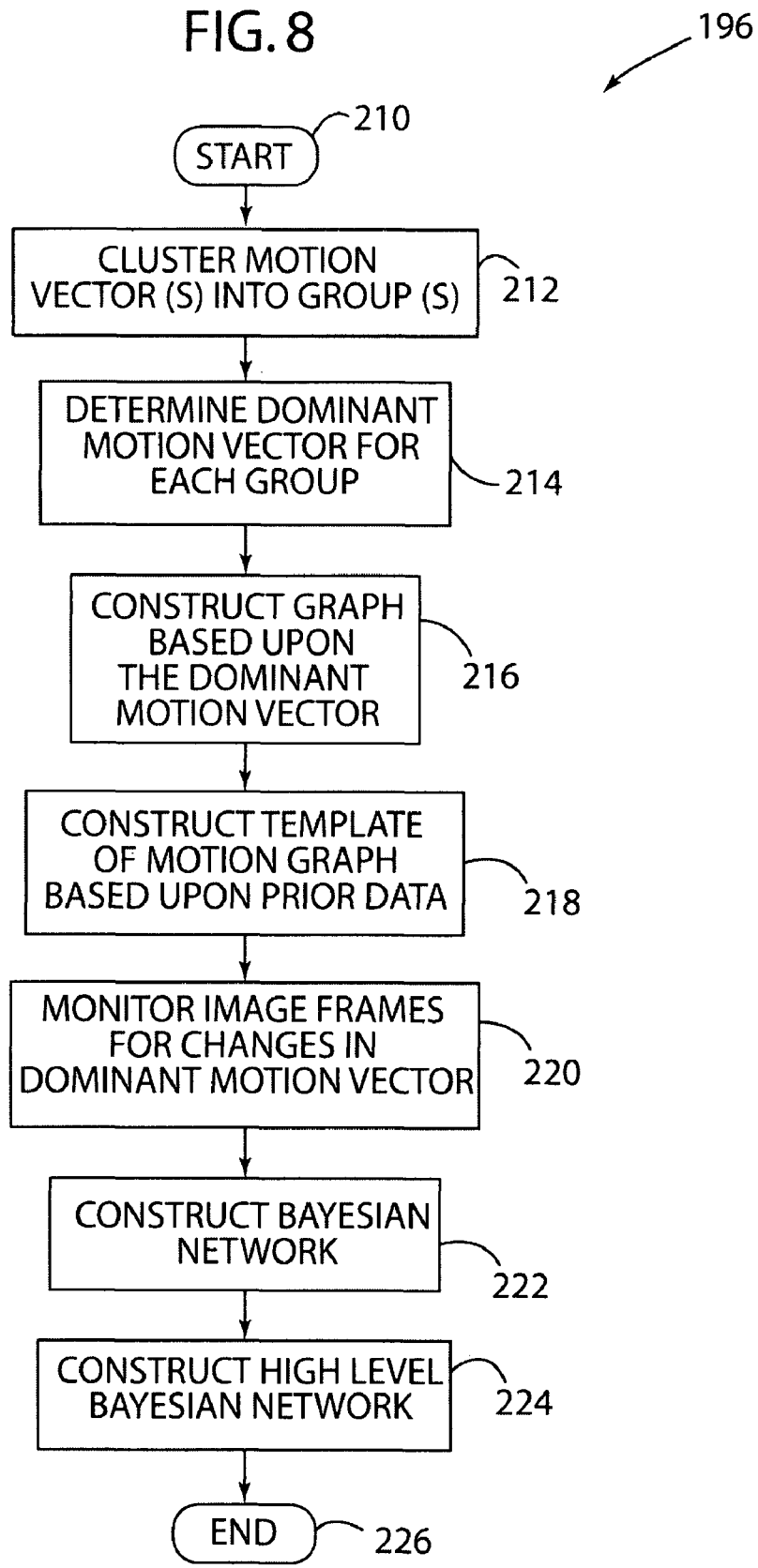

SYSTEM AND METHOD OF AWARENESS DETECTION

TECHNICAL FIELD

The present invention generally relates to a system and method of awareness detection, and more particularly, to a system and method of awareness detection that analyses an appearance and motion of an image.

BACKGROUND OF THE DISCLOSURE

Video imaging systems have been proposed for use in vehicles to monitor a subject person such as the driver and other passengers in the vehicle. Some proposed video imaging systems include one or two cameras focused on the driver of the vehicle to capture images of the driver's face. The video images are processed generally using computer vision and pattern recognition techniques to determine various facial characteristics of the driver including position, orientation, and movement of the driver's eyes, face, and head. Some advanced eye monitoring systems process the captured images to determine eye closure, such as open, half-open (half-closed), and closed states of the eye(s).

By knowing the driver's facial characteristics, vehicle control systems can provide enhanced vehicle functions. For example, a vehicle control system can monitor one or both eyes of the subject driver and determine a condition in which the driver appears to be fatigued or drowsy based on statistical analysis of the cumulated results of open or closed state of the eye(s) over time. Generally, standard human factor measures such as PerClos (percentage of eye closure) and AveClos (average of eye closure) could be used to determine the drowsiness state of the driver. For instance, if the AveClos value is determined to be above a certain threshold, the system may initiate countermeasure action(s) to alert the driver of the driver drowsy condition and/or attempt to awaken the driver.

Some proposed vision-based imaging systems that monitor the eye(s) of the driver of a vehicle require infrared (IR) illumination along with visible light filters to control scene brightness levels inside of the vehicle cockpit. One such driver monitoring system produces bright and dark eye conditions that are captured as video images, which are processed to determine whether the eye is in the open position or closed position. Such prior known driver eye monitoring systems generally require specific setup of infrared illuminators on and off the optical camera axis. In addition, these systems are generally expensive, their setup in a vehicle is not practical, and they may be ineffective when used in variable lighting conditions, especially in bright sunny conditions. Further, variations in eyelash contrast and eye iris darkness levels for different subject persons may cause such prior systems to make erroneous eye state discrimination decisions.

SUMMARY OF THE INVENTION

According to one aspect of the present invention, an awareness detection system includes an imaging device and an awareness processor. The imaging device is positioned to obtain a plurality of images of at least a portion of a subject's head. The awareness processor is in communication with the imaging device, and receives the at least one image from the imaging device. The awareness processor performs the steps including at least conducting a two-point head pose analysis and generating a head pose result when two eyes of the subject are located, conducting a one-point head pose analysis and generating a head pose result when only one eye of the subject is located, and conducting a zero-point head pose analysis and generating a head pose result when zero eyes of the subject are located. The awareness processor further performs the steps of detecting at least one point of interest in the plurality of images, conducting a motion analysis of the plurality of images to estimate a head pose of the subject, wherein a motion vector for each of the at least one point of interest is determined, and determining a state of awareness of the subject based upon the motion analysis.

According to another aspect of the present invention, a method of detecting awareness of a subject includes the steps of obtaining a plurality of images of at least a portion of a subject, conducting a two-point head pose analysis of the subject and generating a head pose result when two eyes of the subject are located, conducting a one-point head pose analysis of the subject and generating a head pose result when only one eye of the subject is located, and conducting a zero-point head pose analysis and generating a head pose result when zero of the eyes of the subject are located. The method further includes the steps of detecting at least one point of interest in the plurality of images, conducting a motion analysis of the plurality of images to estimate a head pose of the subject, wherein a motion vector for each of the at least one point of interest is determined, and determining a state of awareness of the subject based upon the motion analysis.

According to yet another aspect of the present invention, a method of detecting awareness of a subject includes the steps of obtaining a plurality of images of at least a portion of a subject, conducting a two-point head pose analysis of the subject and generating a head pose result when two eyes of the subject are located, conducting a one-point head pose analysis of the subject and generating a head pose result when only one eye of the subject is located, and conducting a zero-point head pose analysis and generating a head pose result when zero eyes of the subject are located. The method further includes the steps of detecting at least one point of interest in the plurality of images, determining a motion vector for each of the at least one point of interest, and clustering the motion vectors for each of the at least one point of interest in a group based upon at least one of an orientation of the motion vector, a magnitude of the motion vector, and a spatial position of the motion vector. Additionally, the method includes the steps of representing each cluster with a dominate motion vector and forming a graph of each dominate motion vector having a motion field, an orientation field, and a position field, matching the graph with at least one template that corresponds to graphs relating to prior information processed by an awareness processor, classifying at least one segmented area that corresponds to the dominate motion vector, monitoring the dominate motion vector across multiple images for classifying the point of interest in order to estimate the head pose of a subject, and determining a state of awareness of a subject that is a driver of a vehicle based upon the classification.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 7 is a flow chart illustrating a method of a motion analysis, in accordance with one embodiment of the present invention; and FIG. 8 is a flow chart illustrating a method of analyzing motion vectors, in accordance with one embodiment of the present invention.

DESCRIPTION OF PREFERRED EMBODIMENTS

Figure 1:
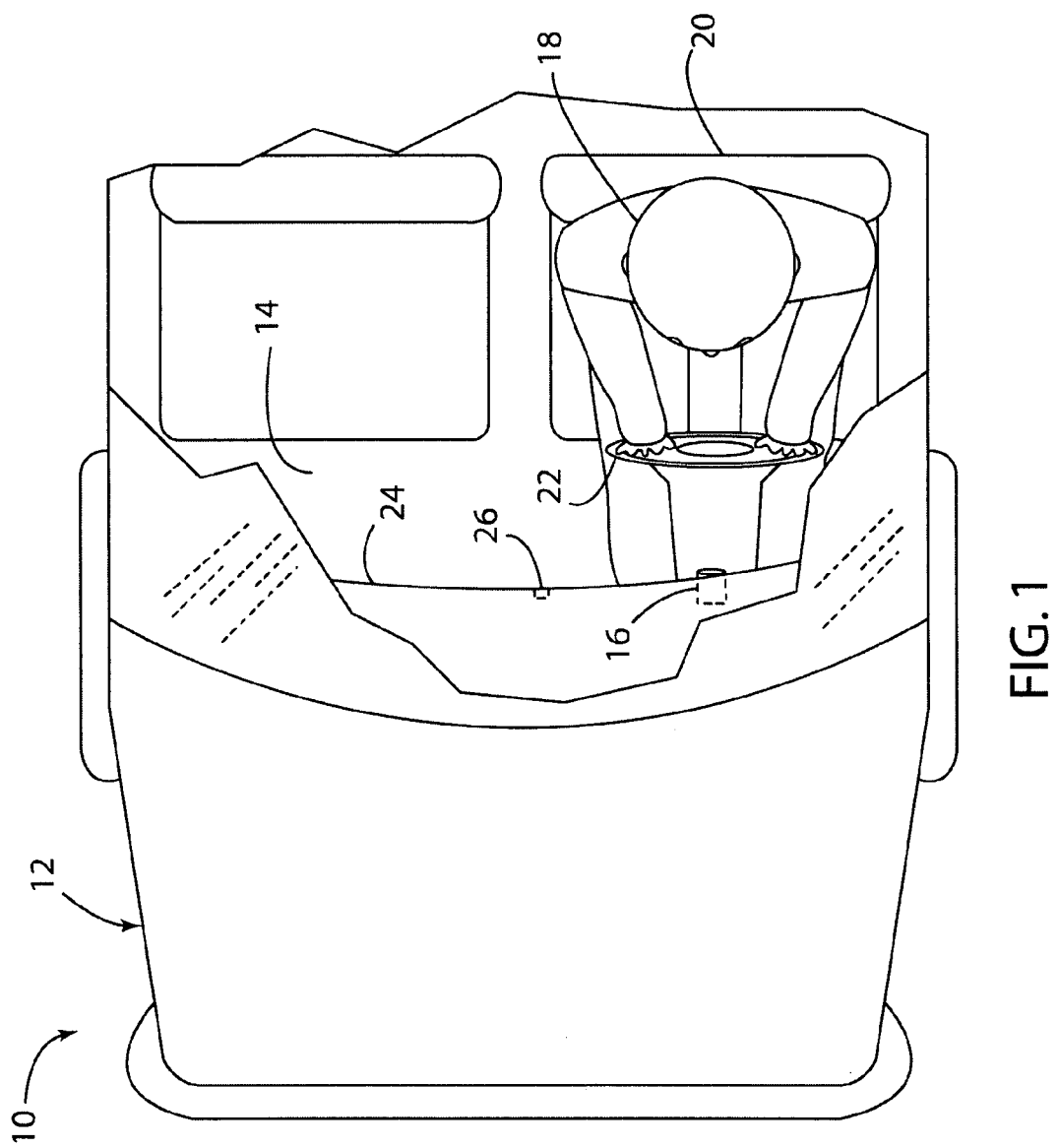
FIG. 1 is a top view of a passenger compartment of a vehicle equipped with an eye monitoring system for monitoring a subject driver, in accordance with one embodiment of the present invention.

Referring to FIG. 1, an awareness detection system is generally shown at reference identifier 10. According to a disclosed embodiment, the awareness detection system 10 is used with a vehicle generally indicated at 12, such that the awareness detection system 10 is inside a passenger compartment 14. The awareness detection system 10 has an imaging device 16 that obtains a plurality of images of at least a portion of a subject's 18 head. Thus, the awareness detection system 10 monitors the subject 18 to determine the awareness of the subject 18, as described in greater detail herein.

The imaging device 16 is shown located generally in front of a driver's seat 20 in the front region of the passenger compartment 14. According to one embodiment, the imaging device 16 is a non-intrusive system that is mounted in the instrument cluster. However, the imaging device 16 may be mounted in other suitable locations onboard the vehicle 12, which allow for acquisition of images capturing the subject's 18 head. By way of explanation and not limitation, the imaging device 16 may be mounted in a steering assembly 22 or mounted in a dashboard 24. While a single imaging device 16 is shown and described herein, it should be appreciated by those skilled in the art that two or more imaging devices may be employed in the awareness detection system 10.

The imaging device 16 can be arranged so as to capture successive video image frames of the region where the subject 18, which in a disclosed embodiment is typically driving the vehicle 12, is expected to be located during normal vehicle driving. More particularly, the acquired images capture at least a portion of the subject's 18 face, which can include one or both eyes. The acquired images are then processed to determine characteristics of the subject's 18 head, and to determine the awareness of the subject 18. For purposes of explanation and not limitation, the detected awareness of the subject 18 can be used to control other components of the vehicle 12, such as, but not limited to, deactivating a cruise control system, activating an audio alarm, the like, or a combination thereof.

According to one embodiment, the awareness detection system 10 can include a light illuminator 26 located forward of the subject 18, such as in the dashboard 24, for illuminating the face of the subject 18. The light illuminator 26 may include one or more infrared (IR) light emitting diodes (LEDs). Either on-access or off-access LEDs may be employed (e.g., no specific IR setup is required, in particular). The light illuminator 26 may be located anywhere onboard the vehicle 12 sufficient to supply any necessary light illumination to enable the imaging device 16 to acquire images of the subject's 18 head.

Figure 2:
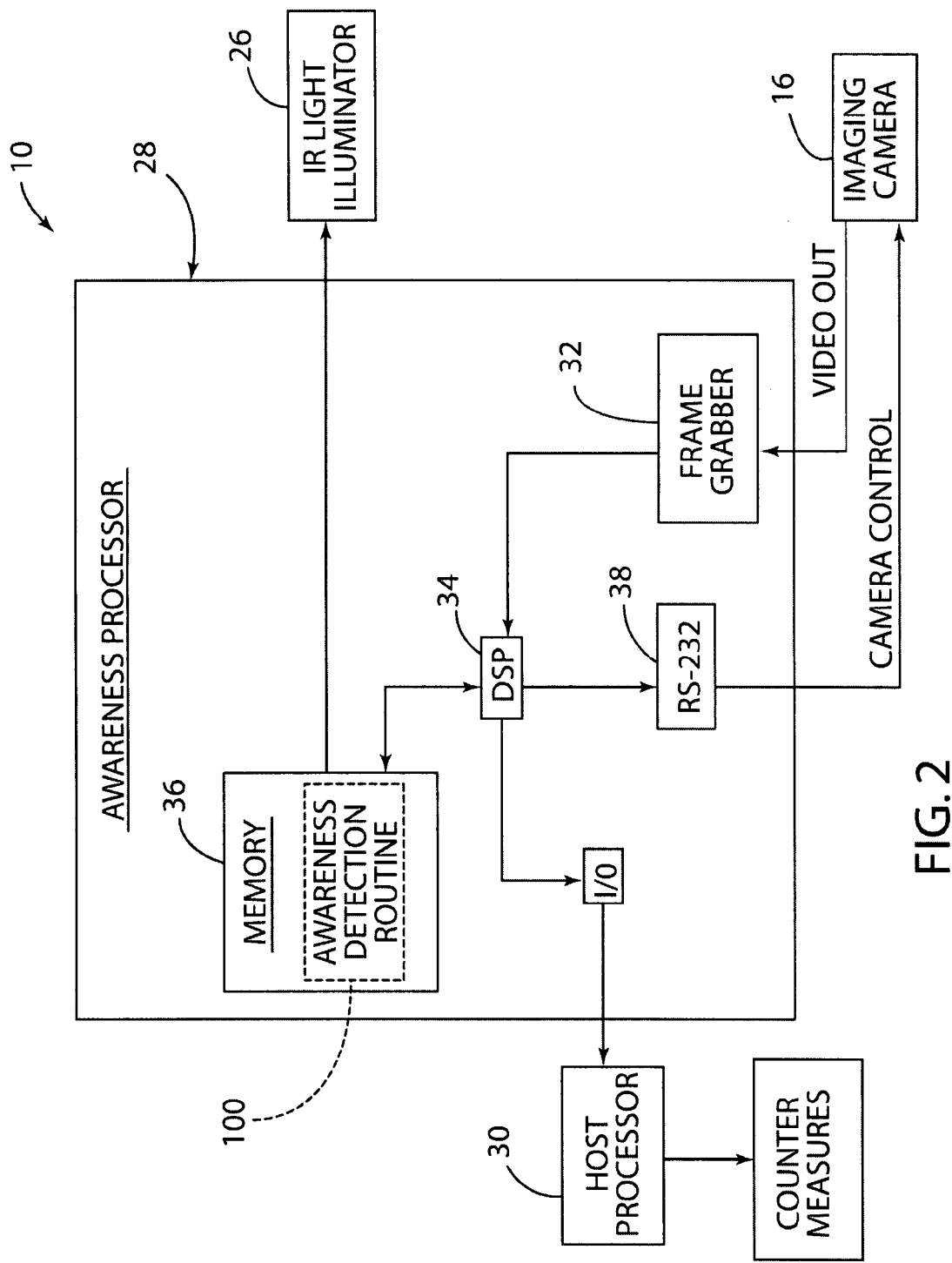
FIG. 2 is a block diagram illustrating an eye monitoring system, in accordance with one embodiment of the present invention.

With regards to FIG. 2, the awareness detection system 10 is shown having the imaging device 16 and the light illuminator 26 in communication with an awareness processor generally indicated at 28. According to one embodiment, the light illuminator is an IR light source that emits light having a wavelength of approximately 940 nanometers (nm). Typically, the awareness processor 28 is in communication with a host processor 30. By way of explanation and not limitation, the imaging device 16 can be a CCD/CMOS active-pixel digital image sensor mounted as a chip onto a circuit board.

The awareness processor 28 can include a frame grabber 32 for receiving the video output frames generated by the imaging device 16. The awareness processor 28 can also include a digital signal processor (DSP) 34 for processing the acquired images. The DSP 34 may be a floating point or fixed point processor. Additionally, the awareness processor 28 can include memory 36, such as random access memory (RAM), read-only memory (ROM), and other suitable memory devices, as should be readily apparent to those skilled in the art. The awareness processor 28 is configured to perform one or more awareness detection routines for controlling activation of the light illuminator 26, controlling the imaging device 16, processing the acquired images to determine the awareness of the subject 18, and applying the processed information to vehicle control systems, such as the host processor 30.

The awareness processor 28 may provide imager control functions using a control RS-232 logic 38, which allows for control of the imaging device 16 via camera control signals. Control of the imaging device 16 may include automatic adjustment of the orientation of the imaging device 16. For purposes of explanation and not limitation, the imaging device 16 may be repositioned to focus on an identifiable feature, and may scan a region in search of an identifiable feature, including the subject's 18 head, and more particularly, one of the eyes of the subject 18. Also, the imager control may include adjustment of the focus and magnification as may be necessary to track identifiable features of the subject 18.

According to a disclosed embodiment, the awareness processor 28 receives at least one image from the imaging device 16, and performs the steps of conducting a two-point analysis when the two eyes of the subject can be located, conducting a one-point analysis when only one eye of the subject 18 can be located, conducting a zero-point head pose analysis when none or zero of the subject's 18 eyes can be tracked, and detecting at least one point of interest in the received image. The awareness processor 28 further performs the steps of conducting a motion analysis of the image to estimate a head pose on the subject 18 to determine the state of awareness of the subject 18, wherein a motion vector for each of the at least one point of interest is determined, and determining a state of awareness of the subject, as described in greater detail herein.

Figure 3:
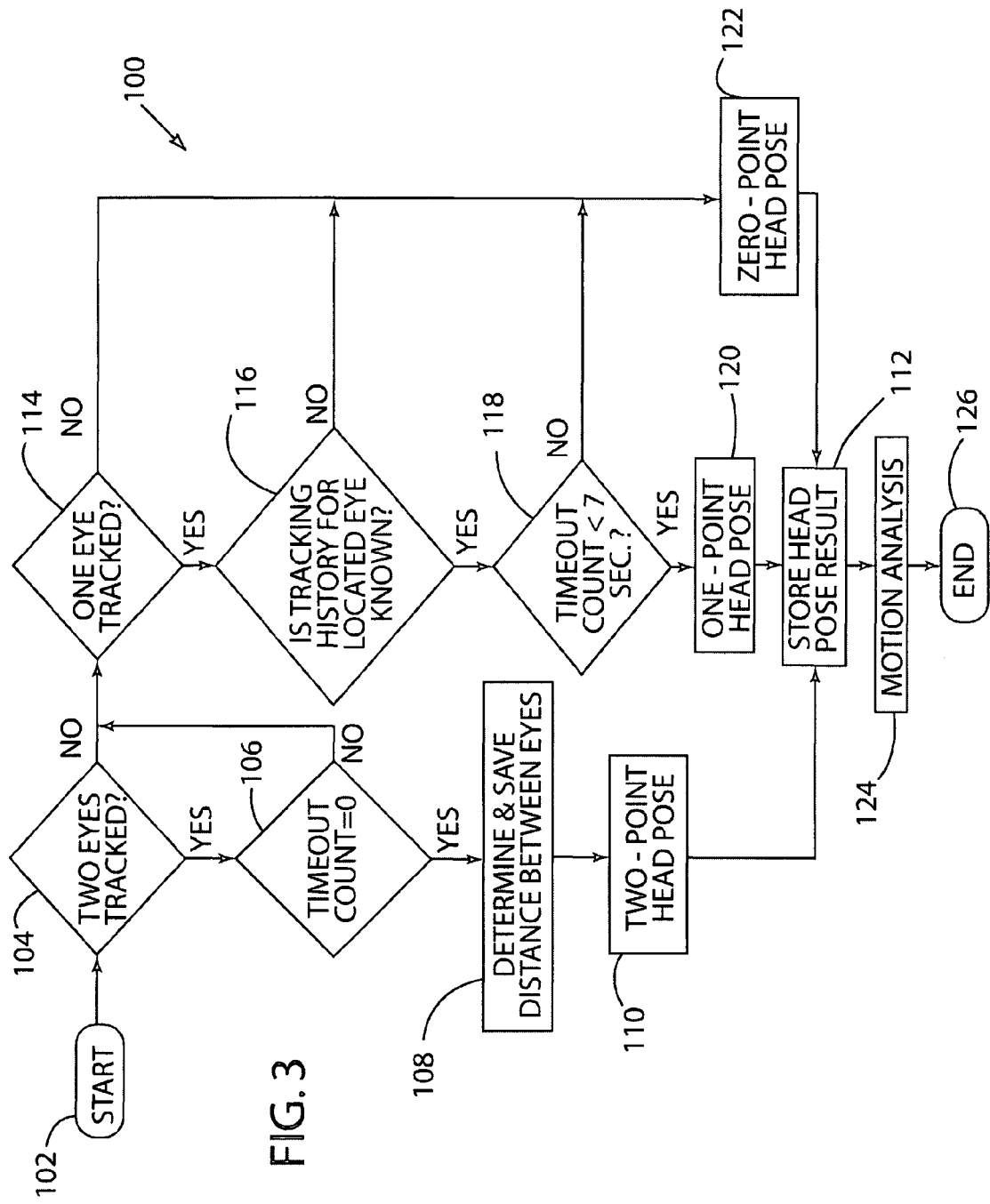
FIG. 3 is a flow chart illustrating a method of processing an acquired image for detecting the awareness of a subject, in accordance with one embodiment of the present invention.

In reference to FIGS. 1-3, a method of processing an image by the awareness processor 28 is generally shown in FIG. 3 at reference identifier 100. The method 100 starts at step 102 and proceeds to step 104, where the awareness processor 28 determines the number of eyes of the subject 18 that can be tracked or located. According to a disclosed embodiment, at decision step 104, it is determined if two eyes of the subject 18 can be tracked.

Exemplary systems and methods of locating or tracking a feature on the subject, such as an eye, are disclosed in U.S. Patent Application Publication No. 2007/0014431, entitled "SYSTEM AND METHOD FOR DETECTING AN EYE," U.S. Patent Application Publication No. 2006/0203088, entitled "SYSTEM AND METHOD OF DETECTING EYE CLOSURE BASED ON LINE ANGLES," U.S. Patent Application Publication No. 2006/0204041, entitled "SYSTEM AND METHOD OF DETECTING EYE CLOSURE BASED ON EDGE LINES," and U.S. Patent Application Publication No. 2005/0232461, entitled "OBJECT TRACKING AND EYE STATE IDENTIFICATION METHOD," all of which are hereby incorporated herein by reference.

Figure 4:
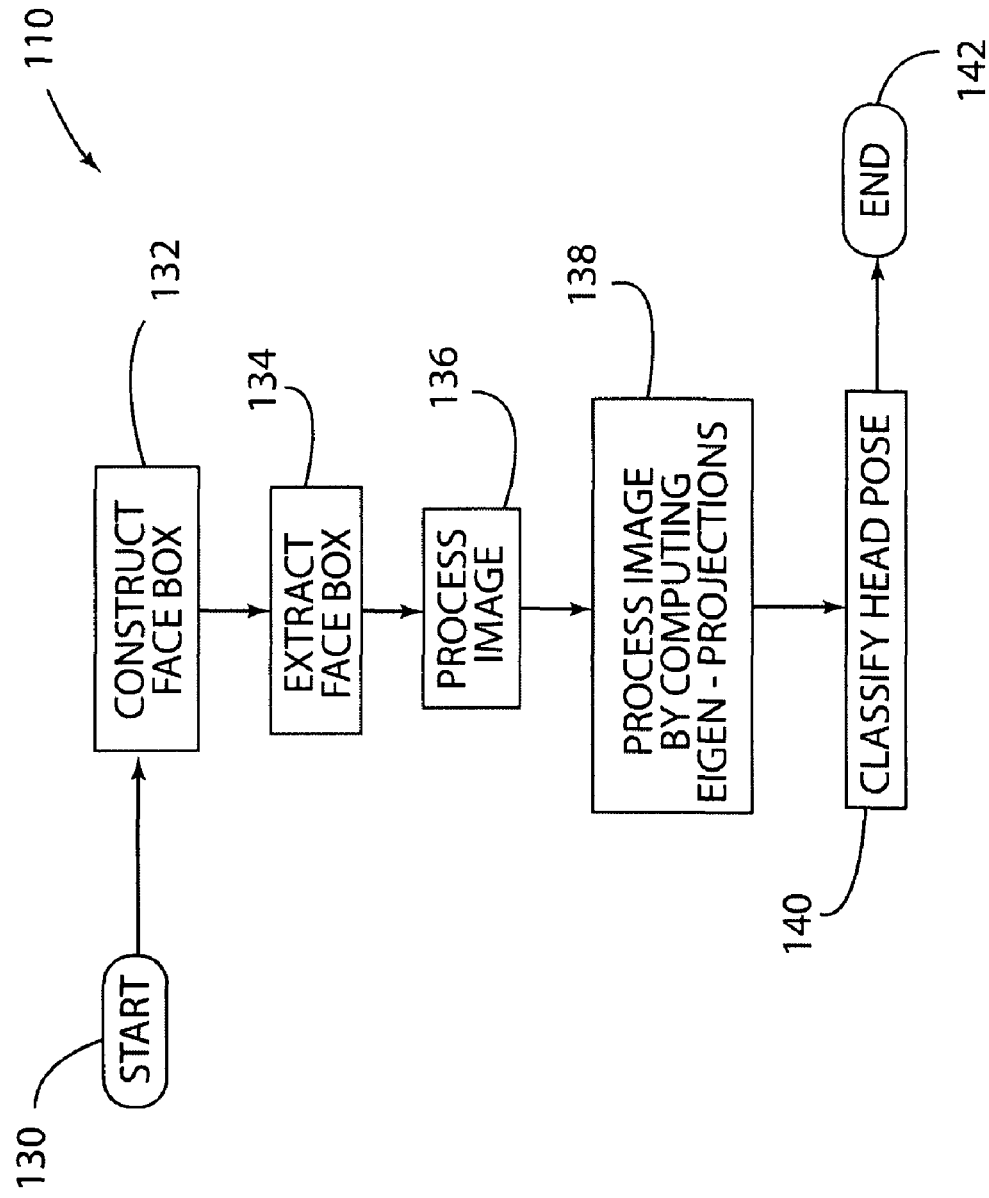
FIG. 4 is a flow chart illustrating a method of a two-point head pose analysis, in accordance with one embodiment of the present invention.

If it is determined at decision step 104 that two eyes of the subject 18 can be tracked or located, then the method 100 proceeds to decision step 106, where it is determined if a timeout count is equal to a predetermined value. By way of explanation and not limitation, the timeout count is typically a predetermined period of time, where the method 100 will not proceed with the analysis if the method 100 has consecutively executed a similar function within the predetermined period of time because the analysis of the image is no longer sufficiently reliable. According to one embodiment, if it is determined at decision step 106 that the timeout count is equal to zero, the method 100 proceeds to step 108, where a distance between the two eyes is determined and saved. Thereafter, at step 110, a two-point head pose analysis is performed, and at step 112, the head pose results are stored. The two-point head pose analysis may be implemented in a sub-routine, as shown in FIG. 4.

If, at decision step 104, it is determined that two eyes of the subject 18 cannot be tracked, then the method 100 proceeds to decision step 114, where it is determined if one eye of the subject 18 can be tracked or located. If it is determined at decision step 114 that one eye of the subject 18 can be tracked or located, then the method 100 proceeds to step 116, where it is determined if the tracking eye history for the located eye is known. According to one embodiment, the tracking eye history includes data, such that the located eye can be identified as being the left eye or right eye of the subject 18. According to a disclosed embodiment, the tracking eye history is a history of the tracked eyes for a predetermined period of time where the same person has been monitored by the awareness detection system 10.

Figure 5:
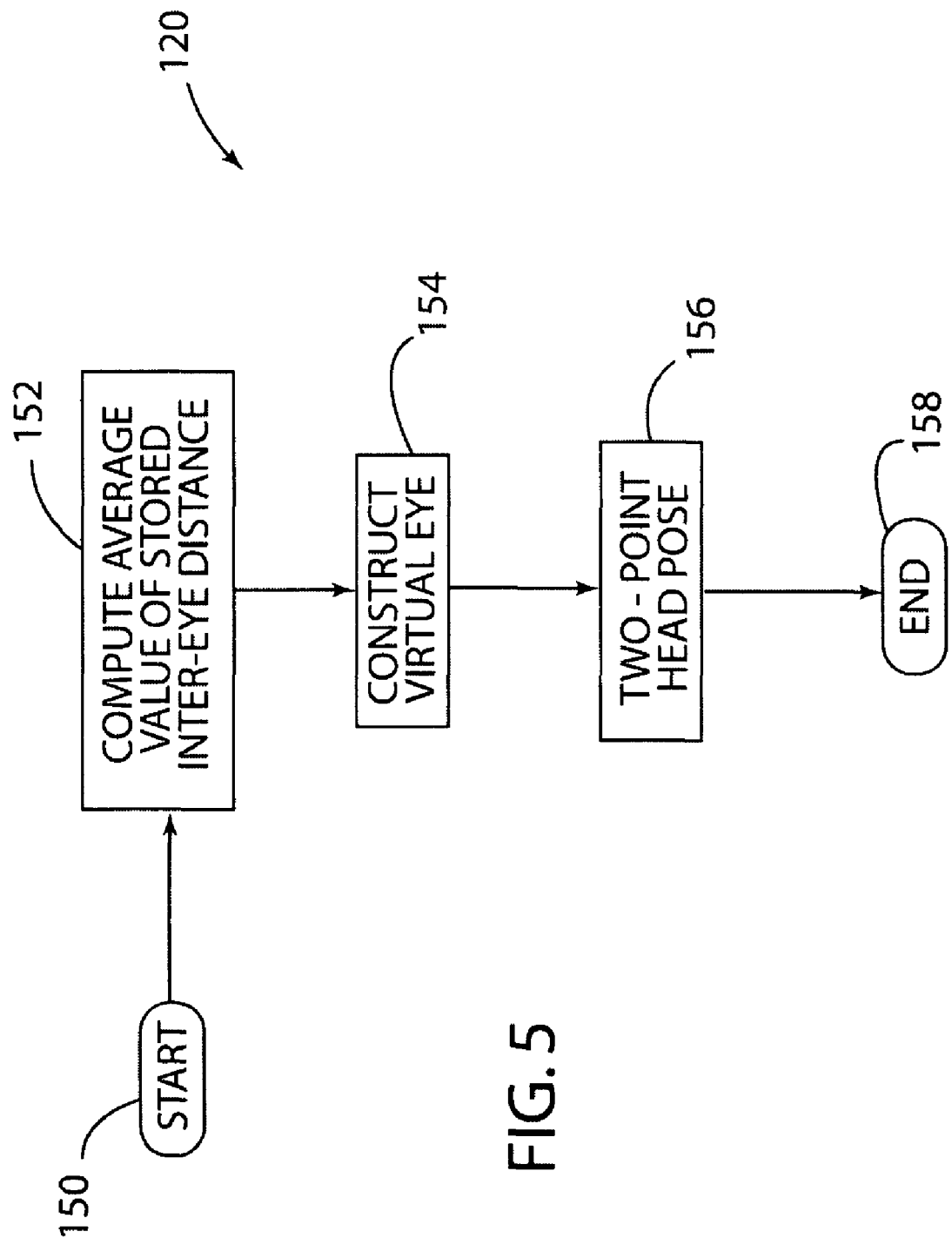
FIG. 5 is a flow chart illustrating a method of a one-point head pose analysis, in accordance with one embodiment of the present invention.

If it is determined at decision step 116 that the tracking eye history is known, then the method 100 proceeds to decision step 118, where it is determined if a timeout count is less than a predetermined value. According to a disclosed embodiment, it is determined if the timeout count is less than seven seconds. If, at decision step 118, it is determined that the timeout count is less than the predetermined value, then at step 120, a one-point head pose analysis is applied, and the head pose results are stored at step 112. The one-point head pose analysis may be implemented in a sub-routine, as shown in FIG. 5.

Figure 6:
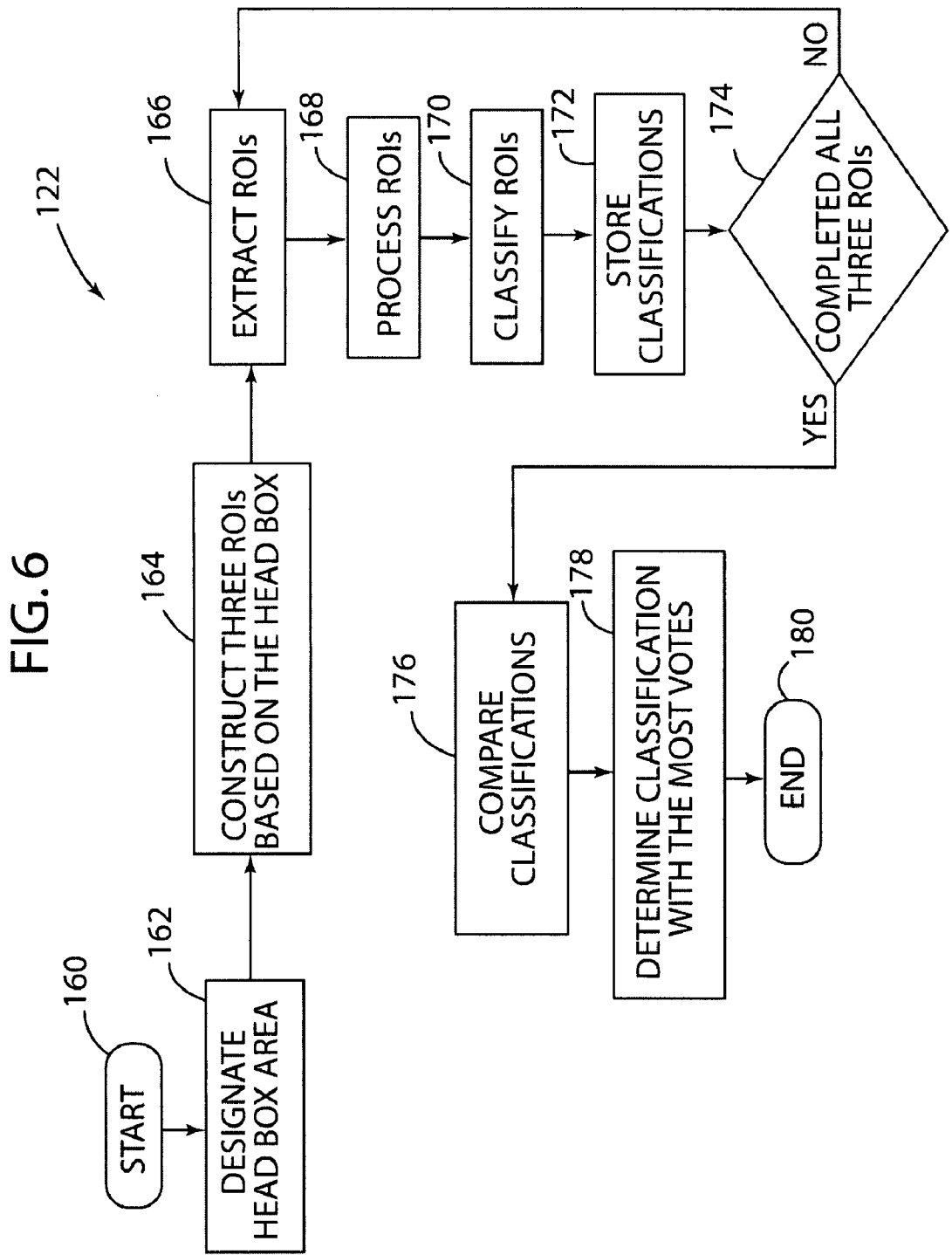
FIG. 6 is a flow chart illustrating a method for a zero-point head pose analysis, in accordance with one embodiment of the present invention.

However, if it is determined at decision step 114 that one eye of the subject 18 cannot be located at step 114, that the tracking eye history is not known at decision step 116, or if the timeout count is greater than the predetermined value at decision step 118, then the method 100 proceeds to step 122, where a zero-point head pose analysis is applied. The zero-point head pose analysis may be implemented in a sub-routine, as shown in FIG. 6. The head pose results from the zero-point head pose analysis are stored at step 112. The head pose results are processed through a motion analysis at step 124, and the method 100 then ends at step 126. An exemplary system and method of conducting a motion analysis is disclosed in U.S. Patent Application Publication No. 2006/0251297, entitled "SYSTEM AND METHOD TO DETERMINE AWARENESS," which is hereby incorporated herein by reference.

According to one embodiment, the two-point head pose analysis monitors the subject 18 by tracking both of the subject's 18 eyes in order for the awareness state of the subject 18 to be determined, and the one-point head pose analysis monitors the subject 18 by tracking one the of the subject's 18 eyes while forming a virtual point based upon known data in order to determine the awareness state of the subject 18. According to one embodiment, the zero-point head pose analysis monitors the subject 18 without positively detecting one or both of the subject's 18 eyes.

With regards to FIGS. 1-4, the two-point head pose analysis (step 110 shown in FIG. 3) is generally shown in FIG. 4, according to one embodiment. The analysis 110 starts at step 130, and proceeds to step 132, where a face box is constructed. According to one embodiment, the face box is constructed based upon the tracked eye locations, the inter-eye distance, the like, or a combination thereof, wherein the face box is a selected portion of the image. At step 134, the face box portion of the image is extracted from the image obtained by the awareness processor 28 from the imaging device 16. Typically, the face box can be resized to fifty-six by fifty-six (56×56) pixels. At step 136, the awareness processor 28 processes the image, such that, according to one embodiment, the awareness processor 28 processes the image by applying affine transform and histogram equalization processing to the face box image. It should be appreciated by those skilled in the art that other suitable image processing techniques can be used additionally or alternatively.

The analysis 110 proceeds to step 138, where the awareness processor 28 continues to process the image. According to a disclosed embodiment, at step 138, the awareness processor 28 processes the image by computing eigen-projections into the front, left, and right spaces of the face box image, which can typically be done by an eigen classifier. According to an alternate embodiment, an AdaBoost classifier, a Neural Network classifier, or the like can be used. At step 140, the subject's 18 head pose obtained from the face box is classified. According to one embodiment, the head pose is classified as front, left, or right where the left and right head pose can also be classified as non-frontal, based upon the eigen distances of the eigen-projections computed at step 138. For purposes of explanation and not limitation, the head pose is classified as a front head pose if it is determined that the head pose is between approximately +/−twenty degrees (20°) from a straight-forward position, and the left head pose and right head pose or non-frontal head pose are any values outside of the +/−twenty degrees (20°) range, respectively. Alternatively, the head pose can be classified for multiple images, and an average of the head pose classification, can be determined to classify the series of images as frontal or non-frontal. The analysis 110 then ends at step 142.

In reference to FIGS. 1-3 and 5, the one-point head pose analysis (step 120 shown in FIG. 3) is shown in FIG. 5, according to one embodiment. The analysis 120 starts at step 150, and proceeds to step 152, where an average value of stored inter-eye distances is computed. According to a disclosed embodiment, the average value of the stored inter-eye distances is based upon the tracked eye history (step 116 shown in FIG. 3). At step 154, a virtual eye is constructed, wherein the virtual eye is typically constructed at the average inter-eye distance based upon tracked eye position and history of the located eye. By way of explanation and not limitation, if the left eye of the subject 18 is located, then the virtual eye represents the right eye of the subject 18, which could not be located in the image. At step 156, a two-point head pose analysis is applied, such that the located eye of the subject 18 and the virtual eye are used as the two points to determine the awareness of the subject 18. Thus, the two-point head pose analysis of step 156 includes substantially the same steps as the two-point head pose analysis of step 110 (FIG. 4), but using the virtual eye to represent the eye of the subject 18 that could not be located. The analysis 120 then ends at step 158.

In reference to FIGS. 1-3 and 6, the zero-point head pose analysis (step 122 shown in FIG. 3) is shown in FIG. 6, according to one embodiment. The zero-point head pose analysis 122 starts at step 160, and proceeds to step 162, where a portion of the image received by the awareness processor 28 from the imaging device 16 is designated as the head box area. According to one embodiment, at step 164, three regions of interests (ROIs) are constructed based upon the head box from the image. According to a disclosed embodiment, a first ROI is the same size as the head box area defined at step 162, a second ROI is two-thirds (⅔) the size of the head box area defined in step 162, and a third ROI is four-thirds (4/3) the size of the head box area defined in step 162. For purposes of explanation and not limitation, the ROI sizes are twenty-four by twenty-eight (24×28) pixels, sixteen by eighteen (16×18) pixels, and thirty-two by thirty-six (32×36) pixels, respectively, according to one embodiment. Typically, the multiple ROIs that vary in size are analyzed in order to reduce the effect of noise in the classification results. By way of explanation and not limitation, when the light emitter 26 emits IR light, the vehicle occupant's face and hair can reflect the IR while other background portions of the image absorb the IR. Thus, the head image may be noisy because of the IR being reflected by the hair and not just the skin of the vehicle occupant's face. Therefore, multiple ROIs having different sizes are used to reduce the amount of hair in the image in order to reduce the noise, which generally result in more accurate classifications.

At step 166, the three ROIs defined in step 164 are extracted from the image, and resized to a predetermined size, such that all three head boxes are the same size. At step 168, the awareness processor 28 processes the ROIs. According to a disclosed embodiment, the awareness processor 28 processes the ROIs by applying affine transform and histogram equalization processing to the image. It should be appreciated by those skilled in the art that other suitable image processing techniques can be used additionally or alternatively.

At step 170, each of the ROIs are designated or classified, wherein, according to one embodiment, the ROIs are given two classifications for two models, such that a first model is a normal pose model, and a second model is an outlier model. At step 172, the classifications results for the two models are stored. Typically, the classifications given to each of the head boxes for both the first and second classifications are left, front, or right.

At decision step 174, it is determined if the awareness processor 28 has processed or completed all the ROIs, such that the three ROIs have been classified and the results of the classification have been stored. If it is determined at decision step 174 that all three ROIs have not been completed, then the analysis 122 returns to step 166. However, if it is determined at decision step 174 that the awareness processor 28 has completed the three ROIs, then the analysis 122 proceeds to step 176. At step 176, the classifications are compared. According to a disclosed embodiment, the three ROIs each have two classifications, which are either left, front, or right, and thus, the number of front, left, and right votes can be determined. By way of explanation and not limitation, each ROI is classified as left, right, or front for both the normal pose model and the outlier model, and thus, there are a total of six classifications for the three ROIs, according to this embodiment. According to an alternate embodiment, each captured image has eighteen classifications, such that three ROIs at three different scales are constructed, wherein each ROI has three models and each model has two classifications. At step 178, the classification with the most votes is used to classify the image, and the analysis 122 then ends at step 180.

For purposes of explanation and not limitation, the outlier model can include a frontal image of the subject 18, such that the frontal classification is determined by patterns in the image that are not the subject's 18 eyes. The patterns can be, but are not limited to, the subject's 18 head, face, and neck outline with respect to the headrest. Thus, a head pose classification or analysis can be performed using such patterns or the like.

With regards to FIGS. 1-3 and 7, the motion analysis (step 124 in FIG. 3) is generally shown in FIG. 7 at reference identifier 124. Typically, the motion analysis provides a more accurate input for a head pose classification, as described in greater detail herein. The motion analysis 124 starts at step 190, and proceeds to step 192, where points of interest of the image are detected. Thus, specific portions of the image are detected based upon predetermined algorithms for detecting ideal portions of the image, such as, but not limited to, Harris detectors, Pyramidal detectors, scale-invariant feature transform (SIFT) detectors, and Morphological operators. According to one embodiment, all points in an image may be used as interest points. According to an alternate embodiment, the detected interest points can be extracted points on a grid of a predetermined resolution.

At step 194, an optical flow analysis is performed, such that a motion vector for the points of interest is determined. Typically, at least two successive video images are used in order to compute the motion vector. According to one embodiment, the Lucas-Kanade method for optical flow computation is used to determine the motion vectors. Generally, the Lucas-Kanade method calculates the motion between two image frames, which are taken at different times, such that partial derivatives with respect to the spatial and temporal coordinates are used. Thus, each motion vector typically has an orientation value and a magnitude value.

The motion analysis 124 then proceeds to step 196, where the motion vectors are analyzed. According to one embodiment, the motion image, which includes the motion vectors, is segmented to reduce the effect of irrelevant objects in the classification of the image, as described in greater detail below. At step 198, the image is classified where, according to one embodiment, the image is determined to be one of two classifications, wherein the two classifications are distracted or non-distracted. The motion analysis 124 then ends at step 200.

In regards to FIGS. 1-3 and 7-8, the motion vector analysis (step 196 in FIG. 7) is generally shown in FIG. 8 at reference identifier 196. The motion vector analysis 196 starts at step 210, and proceeds to step 212, where clusters of motion vectors are grouped together. According to a disclosed embodiment, the motion vectors are grouped according to their orientation value, magnitude value, and spatial position. Additionally, known elements of the portion of an image that the motion vector represents can be considered when grouping motion vectors, such as, but not limited to, whether the image contains a face, hair, a portion of a side window, mouth-motion-area, facial expressions area, the like, or a combination thereof. According to an alternate embodiment, statistical methods can be used to group the motion vectors, such as, but not limited to, histogram techniques, a mixture of density techniques, K-means techniques, mean-shift techniques, the Hankle matrix, the like, or a combination thereof.

At step 214, a dominant motion vector is determined for each group of motion vectors. Typically, the dominant motion vector represents the average orientation and magnitude of the motion vectors that were grouped together in a particular group. At step 216, a graph is constructed based upon the dominant motion vector. According to one embodiment, the graph includes data relating to the area motion, orientation value, and position of the dominant motion vector. At step 218, a template of the motion graph is constructed based upon prior data. Typically, the template of the motion graph is compared to the graph constructed at step 216 in order to match portions of the image. Typically, when portions of the image are matched between the graph constructed at step 216 and the template of the motion graph constructed at step 218, portions of the image can be identified, such as, but not limited to, a face, hair, mouth, the like, or a combination thereof.

The motion analysis 196 then proceeds to step 220, where image frames are monitored for changes in the dominant motion vector. According to one embodiment, particular dominant motion vectors are considered based upon the matching of the graph constructed at step 216 and the graph constructed at step 218. Thus, dominant vectors that represent noise or background areas are given less consideration. At step 222, a Bayesian network is constructed to model the states and transitions between the dominant vectors. Generally, a Bayesian network is a probabilistic graphical model that represents a set of variables and their probabilistic dependencies. According to one embodiment, the Bayesian network includes five states, such as, but not limited to, frontal, left, right, up, and down. At step 224, a high level Bayesian network is constructed based upon multiple states of the dominant vector over multiple images, such that the image can be classified, and the motion analysis 196 then ends at step 226.

By way of explanation and not limitation, in operation, the analyzed image during the zero-point head pose analysis 122 can be sixty by forty (60×40) pixels, where the captured image from the imaging camera 16 can be seven-hundred-twenty by four-hundred-eighty (720×480) pixels, according to one embodiment. According to a disclosed embodiment, one or more software routines that can be implemented in the awareness detection routine 100 for implementing the zero-point head pose analysis 122 can be approximately one-hundred-nine kilobytes (109 KB), and the analyzed appearance data for the zero-point head pose analysis 122 can be approximately one-hundred sixty-nine kilobytes (169 KB). Further, the time for implementing the zero-point head pose analysis 122 can be approximately 3.3 milliseconds (ms), according to one embodiment. Thus, storing the one or more software routines is economical, and analyzing the subject 18 using the zero-point head pose analysis 122 is substantially real time.

According to an alternate embodiment, the motion analysis 124 can be performed prior to eye tracking at step 116 and/or the zero-point head pose at step 122. Thus, the input used for eye tracking 116 and/or the zero-point head pose 122 has reduced noise due to the motion analysis 124, which affects the results of the eye tracking analysis 116 and the zero-point analysis 122.

Advantageously, the awareness detection system 10 and method 100 can be used to determine the awareness of a vehicle's occupant, whether both eyes, one eye, or no eyes of the occupant can be determined. Thus, the awareness detection system 10 and method 100 can quickly and accurately detect and classify a head pose, without any detection of points and with variations in head shapes and appearance in the IR spectrum. Additionally, the awareness detection system 10 and method 100 may accurately classify the occupant, such as to determine whether the occupant is either distracted or not distracted, in one embodiment, since the results of the awareness detection system 10 and method 100 are not dependent upon a single feature of the vehicle's occupant.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An awareness detection system comprising:
    an imaging device positioned to obtain a plurality of images of at least a portion of a subject's head; and
    an awareness processor in communication with said imaging device, wherein said awareness processor receives said plurality of images from said imaging device and performs the steps comprising:
        conducting a two-point head pose analysis of said subject and generating a head pose result when two eyes of said subject are located;
        conducting a one-point head pose analysis of said subject and generating a head pose result when only one eye of said subject is located;
        conducting a zero-point head pose analysis of said subject and generating a head pose result when zero said eyes of said subject are located;
        detecting at least one point of interest in said plurality of images;
        conducting a motion analysis of said plurality of images to estimate a head pose of said subject based upon said generated head pose result, wherein a motion vector for each said at least one point of interest is determined; and
        determining a state of awareness of said subject based upon said motion analysis.

2. The awareness detection system of claim 1, wherein said awareness processor further performs the step comprising of storing head pose results from at least one of said two-point head pose analysis, said one-point head pose analysis, and said zero-point head pose analysis.

3. The awareness detection system of claim 1, wherein said step of conducting a motion analysis comprises clustering said motion vectors for each of said at least one point of interest into groups based upon at least one of an orientation of said motion vector, a magnitude of said motion vector, and a spatial position of said motion vector.

4. The awareness detection system of claim 3, wherein said step of conducting a motion analysis further comprises representing each said cluster with a dominate motion vector and forming a graph of each said dominate motion vector having a motion field, an orientation field, and a position field.

5. The awareness detection system of claim 4, wherein said step of conducting a motion analysis further comprises the step of matching said graph with at least one template that corresponds to graphs relating to prior information processed by said awareness processor.

6. The awareness detection system of claim 5, wherein said step of conducting a motion analysis further comprises the step of classifying at least one segmented area that corresponds to said dominate motion vector, and monitor said dominate motion vector across multiple said images for classifying said points of interest.

7. The awareness detection system of claim 1, wherein said step of conducting a zero-point head pose analysis comprises the steps of extracting at least one region of interest from said image and classifying said region.

8. The awareness detection system of claim 7, wherein said step of conducting a zero-point head pose analysis further comprises computing a vote total of said classifications for said at least one region of interest and determining said classification based upon said vote total for said classification of said at least one region of interest to classify said region.

9. The awareness detection system of claim 1, wherein said awareness detection system is used with a vehicle to detect said subject in said vehicle.

10. A method of detecting awareness of a subject, said method comprising the steps of:
    obtaining a plurality of images of at least a portion of a subject;
    conducting a two-point head pose analysis of said subject and generating a head pose result when two eyes of said subject are located;
    conducting a one-point head pose analysis of said subject and generating a head pose result when only one said eye of said subject is located;
    conducting a zero-point head pose analysis of said subject and generating a head pose result when zero of said eyes of said subject are located;
    detecting at least one point of interest in said plurality of images;
    conducting a motion analysis of said plurality of images to estimate a head pose of said subject based upon said head pose result, wherein a motion vector for each said at least one point of interest is determined; and
    determining a state of awareness of said subject based upon said motion analysis.

11. The method of claim 10 further comprising the step of storing head pose results from at least one of said two-point head pose analysis, said one-point head pose analysis, and said zero-point head pose analysis.

12. The method of claim 10, wherein said step of conducting a motion analysis comprises clustering said motion vectors for each of said at least one point of interest into groups based upon at least one of an orientation of said motion vector, a magnitude of said motion vector, and a spatial position of said motion vector.

13. The method of claim 12, wherein said step of conducting a motion analysis further comprises representing each said cluster with a dominate motion vector and forming a graph of each said dominate motion vector having a motion field, an orientation field, and a position field.

14. The method of claim 13, wherein said step of conducting a motion analysis further comprises the step of matching said graph with at least one template that corresponds to graphs relating to prior information processed by an awareness processor.

15. The method of claim 14, wherein said step of conducting a motion analysis further comprises the step of classifying at least one segmented area that corresponds to said dominate motion vector, and monitor said dominate motion vector across multiple said images for classifying said points of interest.

16. The method of claim 10, wherein said step of conducting a zero-point head pose analysis comprises the steps of extracting at least one region of interest from said image and classifying said at least one region of interest.

17. The method of claim 16, wherein said step of conducting a zero-point head pose analysis further comprises computing a vote total of said classifications for said at least one region of interest and determining said classification based upon said vote total for said classification of said at least one region of interest to classify said region.

18. The method of claim 10, wherein said method detects awareness of said subject that is a driver of a vehicle.

19. A method of detecting awareness of a subject, said method comprising the steps of:
    obtaining a plurality of images of at least a portion of a subject;
    conducting a two-point head pose analysis of said subject and generating a head pose result when two eyes of said subject are located;
    conducting a one-point head pose analysis of said subject and generating a head pose result when only one said eye of said subject is located;
    conducting a zero-point head pose analysis of said subject and generating a head pose result when zero of said eyes of said subject are located;
    detecting at least one point of interest in said plurality of images;
    determining a motion vector for each said at least one point of interest;
    clustering said motion vectors for each of said at least one point of interest into groups based upon at least one of an orientation of said motion vector, a magnitude of said motion vector, and a spatial position of said motion vector;
    representing each said cluster with a dominate motion vector and forming a graph of each said dominate motion vector having a motion field, an orientation field, and a position field;
    matching said graph with at least one template that corresponds to graphs relating to prior information processed by an awareness processor;
    classifying at least one segmented area that corresponds to said dominate motion vector;
    monitoring said dominate motion vector across multiple said images for classifying said at least one point of interest in order to estimate a head pose of said subject; and
    determining a state of awareness of said subject that is a driver of a vehicle based upon said classification.

20. The method of claim 19 further comprising the step of storing head pose results from at least one of said two-point head pose analysis, said one-point head pose analysis, and said zero-point head pose analysis.

21. The method of claim 19 further comprising the steps of conducting a zero-point head pose analysis comprises the steps of extracting at least one region of interest from said plurality of images, classifying said at least one region of interest, computing a vote total of said classifications for said at least one region of interest, and determining said classification based upon said vote total for said classification of said at least one region of interest to classify said at least one region of interest.

* * * * *